US009762719B2

(12) United States Patent
Tartz et al.

(10) Patent No.: US 9,762,719 B2
(45) Date of Patent: Sep. 12, 2017

(54) SYSTEMS AND METHODS TO ENHANCE ELECTRONIC COMMUNICATIONS WITH EMOTIONAL CONTEXT

(75) Inventors: Robert S. Tartz, San Diego, CA (US); Frederick D. Kim, San Diego, CA (US); James B. Cary, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 960 days.

(21) Appl. No.: 13/228,660

(22) Filed: Sep. 9, 2011

(65) Prior Publication Data

US 2013/0063256 A1  Mar. 14, 2013

(51) Int. Cl.
  *H04M 1/725* (2006.01)
  *G06F 3/01* (2006.01)
  *G06F 3/00* (2006.01)

(52) U.S. Cl.
  CPC ........ *H04M 1/72547* (2013.01); *G06F 3/005* (2013.01); *G06F 3/016* (2013.01); *G06F 2203/011* (2013.01); *H04M 2250/12* (2013.01)

(58) Field of Classification Search
  CPC .... G06F 3/016; G06F 3/005; G06F 2203/011; G06F 2203/014; G06F 2203/016; H04M 19/047; H04M 1/72547; H04M 2250/12; A61B 5/165; G08B 6/00; G10H 2220/311
  USPC ...................................................... 340/407.1
  See application file for complete search history.

(56) References Cited

U.S. PATENT DOCUMENTS

| | | | |
|---|---|---|---|
| 6,703,550 B2 * | 3/2004 | Chu ................................ 84/609 |
| 7,159,008 B1 * | 1/2007 | Wies et al. .................... 709/206 |
| 7,280,041 B2 | 10/2007 | Ryou | |
| 7,766,828 B2 | 8/2010 | Ishii et al. | |
| 8,412,282 B2 * | 4/2013 | Yoon et al. .................... 455/567 |
| 2005/0114142 A1 * | 5/2005 | Asukai et al. ................ 704/270 |
| 2005/0181827 A1 * | 8/2005 | Nieminen-Sundell et al. ............................. 455/557 |
| 2005/0289582 A1 | 12/2005 | Tavares et al. | |
| 2006/0014569 A1 * | 1/2006 | DelGiorno ............. H04M 9/04 455/567 |
| 2006/0288137 A1 * | 12/2006 | Grant et al. ..................... 710/62 |

(Continued)

FOREIGN PATENT DOCUMENTS

| | | |
|---|---|---|
| CN | 1738218 A | 2/2006 |
| EP | 1532926 A1 | 5/2005 |

(Continued)

OTHER PUBLICATIONS

International Search Report and Written Opinion—PCT/US2012/054257—ISA/EPO—Jan. 22, 2013.

*Primary Examiner* — Nay Tun
(74) *Attorney, Agent, or Firm* — Charles E. Eggers

(57) ABSTRACT

Methods, systems, and devices are described for augmenting electronic communications with emotional context. Electronic communications is received from a first device. An expression of a user of the first device is captured at the first device. Data based on the captured expression is received from the first device. The received data is analyzed to determine emotional context associated with the user of the first device. A haptic response is generated based on the determined emotional context. The haptic response is associated with the received electronic communications. The haptic response is provided concurrently with the access of the electronic communications to indicate the emotional context of the user.

31 Claims, 9 Drawing Sheets

(56) References Cited

U.S. PATENT DOCUMENTS

| | | |
|---|---|---|
| 2007/0066310 A1 | 3/2007 | Haar et al. |
| 2008/0219457 A1* | 9/2008 | Aarts ................. G10L 21/0364 381/57 |
| 2008/0223627 A1* | 9/2008 | Lacroix et al. ............ 178/18.01 |
| 2008/0242287 A1* | 10/2008 | Luciani ............. H04M 1/72577 455/419 |
| 2008/0287147 A1* | 11/2008 | Grant ................... G06F 1/1626 455/466 |
| 2009/0219252 A1* | 9/2009 | Jarventie et al. ............ 345/173 |
| 2010/0003969 A1 | 1/2010 | Isobe et al. |
| 2010/0123588 A1* | 5/2010 | Cruz Hernandez ........ 340/573.1 |
| 2010/0156818 A1* | 6/2010 | Burrough et al. ........... 345/173 |
| 2010/0325078 A1 | 12/2010 | Lee |
| 2011/0082695 A1 | 4/2011 | Bengt |
| 2011/0169908 A1* | 7/2011 | Lee et al. .................. 348/14.02 |
| 2011/0201414 A1* | 8/2011 | Barclay .............. G07F 17/3206 463/25 |
| 2012/0188065 A1* | 7/2012 | Garigen .................... 340/407.1 |

FOREIGN PATENT DOCUMENTS

| | | |
|---|---|---|
| EP | 2175647 A1 | 4/2010 |
| JP | 2002278563 A | 9/2002 |
| JP | 2002281117 A | 9/2002 |
| JP | 2003179976 A | 6/2003 |
| JP | 2004094389 A | 3/2004 |
| JP | 2005072743 A | 3/2005 |
| JP | 2006005945 A | 1/2006 |
| JP | 2006330958 A | 12/2006 |
| JP | 2007142578 A | 6/2007 |
| JP | 2007251581 A | 9/2007 |
| KR | 20040053156 A | 6/2004 |
| KR | 20080071560 A | 8/2008 |
| KR | 20100017875 A | 2/2010 |
| KR | 20110036617 A | 4/2011 |
| KR | 20110088520 A | 8/2011 |
| WO | WO-2010059513 A2 | 5/2010 |
| WO | 2011026099 A1 | 3/2011 |

* cited by examiner

SYSTEMS AND METHODS TO ENHANCE ELECTRONIC COMMUNICATIONS WITH EMOTIONAL CONTEXT

BACKGROUND

Wireless communication systems are widely deployed to provide various types of electronic communication content such as voice, data, and so on. While electronic forms of communication (e.g., email, text messages, voicemail, phone calls) have enabled people to conveniently contact and interact with others, the richness of electronic communications falls short of direct, face-to-face communication.

Electronic communications, by themselves, do not generally convey the full emotional state of the sending party. For example, research suggests that 7% of emotional context in a given message is conveyed by the words (e.g., text in an electronic communications). Another 38% of the emotional context is conveyed vocally by the tone of the voice. The final 55% is expressed using non-verbal communication, such as facial expression and other body gestures. (See generally Mehrabian, Albert; Ferris, Susan R. (1967). "Inference of Attitudes from Nonverbal Communication in Two Channels". *Journal of Consulting Psychology* 31 (3): 248-252).

With regard to traditional electronic communications, the emotional context or emotional state of the sending party may be misinterpreted by the receiving party. As a result, electronic communications may not provide the level of richness that face-to-face communications provide.

SUMMARY

The described features generally relate to one or more improved systems, methods, and/or devices for enhancing electronic communications with emotional context information. In one configuration, a user of a first device may originate an electronic communication. Expressions of the user may be captured in connection with the origination of the communication. The electronic communication and data based on the captured expressions may be transmitted to a second device. The data may be analyzed to determine an emotional state of the user based on the expressions. A haptic-based response may be generated at the second device and associated with the received electronic communications. The haptic-based response may represent the emotional state of the first user. In one example, the haptic response may be provided to the user of the second device when that user accesses the electronic communications.

In one configuration, the generation of data based on the captured expression may include identifying an arousal level and a valence level associated with the captured expression. The arousal level and the valence level may be representative of an emotional state of the user of the first device. A time indicator representative of the real-time emotional state of the user of the first device may also be identified. Data representative of the identified arousal level, valence state, and time indicator may be encoded.

In one example, the arousal level may indicate a level of intensity associated with the captured expression of the user of the first device. The valence level may indicate a level of pleasure associated with the captured expression of the user of the first device.

In one configuration, the generation of data based on the captured expression may also include identifying an arousal level and a valence level associated with the captured expression at each of a plurality of different time periods. The arousal level and the valence level may be representative of an emotional state of the user of the first device at each of the plurality of different time periods. Data representative of the identified arousal level and valence state at each of the plurality of different time periods may be encoded.

A method to enhance electronic communications with emotional context is also described. In one example, electronic communications may be received from a first device including data based on an expression of a user captured at the first device. A haptic response may be generated for the received data based on the captured expression. The haptic response may be associated with the received electronic communications.

The received data may be analyzed to extract an indicator representative of an emotional state of the user of the first device. The emotional state of the user of the first device may be determined based on the extracted indicator. The indicator may include an arousal level and a valence level associated with the captured expression of the user of the first device. The arousal level may indicate a level of intensity associated with the captured expression of the user of the first device. The valence level may indicate a level of pleasure associated with the captured physical express of the user of the first device. The haptic response may be generated based on the determined emotional state.

The received data may also be analyzed to extract a time indicator representative of the real-time emotional state of the user of the first. The generation of the haptic response may be synchronized with the playback of the received electronic communications using the time indicator.

The received data may also be analyzed to extract a plurality of indicators. In one configuration, each extracted indicator may represent an emotional state of the user of the first device at each of a plurality of different time periods. An emotional state of the user of the first device may be determined based on each of the extracted indicators. A plurality of haptic responses may be generated. Each haptic response may be representative of one of the determined emotional states.

In one example, an image may be generated in response to the received data based on the captured expression of the user of the first device. The generated image may be displayed concurrently with the generated haptic response. The image and the haptic response may be representative of an emotional state of the user of the first device. In one configuration, an audio cue may be generated in response to the generated data based on the captured expression of the user of the first device. The generated audio cue may be outputted concurrently with the generated haptic response. The audio cue and the haptic response may be representative of an emotional state of the user of the first device.

In one configuration, the haptic response may be generated based on a preference selected by a user. In one example, the haptic response may be generated based on a type of the electronic communications received from the first device. The haptic response may also be generated based on location information. Further, the haptic response may be generated based on a level of received noise.

In one example, the captured expression of the user may include a vocal expression, a facial expression, or physiological data. The haptic response may include a temperature-based haptic response, a vibration-based haptic response, a pressure-based haptic response, a texture-based haptic response, or a tapping-based haptic response.

A device to enhance electronic communications with emotional context is also described. The device may include a receiver configured to receive electronic communications from a first device including data based on an expression of a user captured at the first device. The device may also include a response generation module configured to generate a haptic response for the received data based on the captured expression. The haptic response may be associated with the received electronic communications.

A system to enhance electronic communications with emotional context is also described. The system may include means for capturing an expression of a user of a first device, and means for generating data based on the captured expression of the user. The system may further include means for transmitting the generated data, and means for receiving, at a second device, the generated data based on the captured expression. In addition, the system may include means for generating, at the second device, a haptic response for the generated data based on the captured expression.

A computer program product including a non-transitory computer-readable medium is also described. The computer-readable medium may include code to receive electronic communications from a first device including data based on an expression of a user captured at the first device. The medium may further include code to generate a haptic response for the received data based on the captured expression. In one example, the haptic response may be associated with the received electronic communications.

BRIEF DESCRIPTION OF THE DRAWINGS

A further understanding of the nature of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, devices, and systems are described to augment electronic communications with emotional context. A first device may generate and transmit electronic communications to a second device. The first device may also capture an expression of a user of the first device (referred to hereafter as a first user) and generate data that infers an emotional state of the first user. The generated data may be transmitted to the second device. In one configuration, the second device may receive the data and determine the emotional state of the first user based on the received data. The second device may render a haptic response based on the determined emotional state. The haptic response may be provided to a user of the second device (referred to hereafter as a second user) in connection with the electronic communications received from the first device.

In one example, the first device may capture a number of expressions and generate data that indicates the emotional state of the first user over a period of time. The data may be transmitted to the second device along with electronic communications from the first device. The second device may determine the emotional states of the first user over a period of time. In one configuration, an electronic communication may be provided to the second user together with a haptic response that may vary over time to indicate the changing emotional state of the first user. As a result, the second user may watch, listen, read, etc. electronic communications while concurrently receiving a haptic response in real-time that indicates the range of emotional states of the first user.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
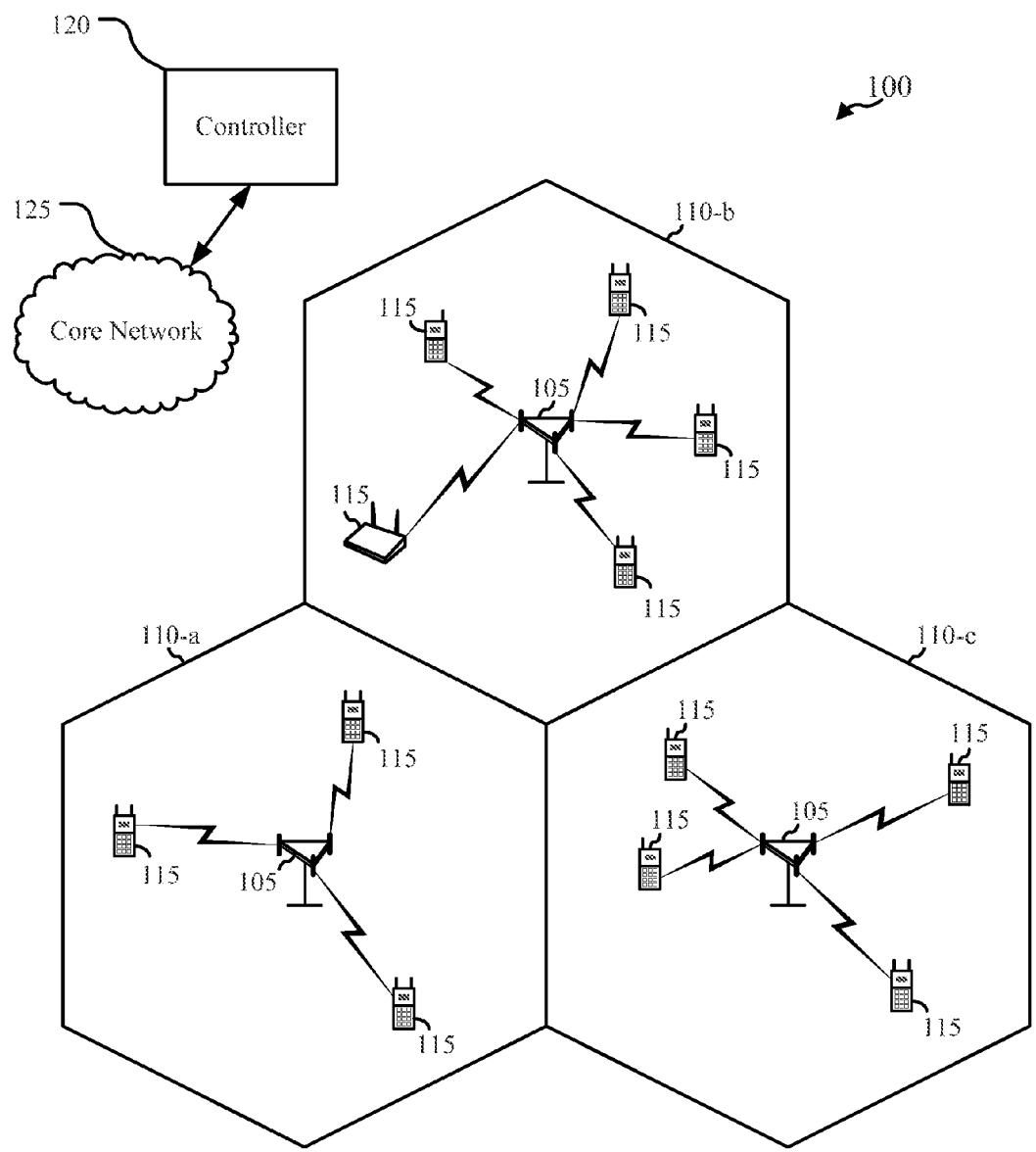
FIG. 1 illustrates a block diagram of a wireless communications system.

Referring first to FIG. 1, a block diagram illustrates an example of a wireless communications system 100. The system 100 includes base stations 105 (or cells), mobile devices 115, a base station controller 120, and a core network 125 (the controller 120 may be integrated into the core network 125). The system 100 may support operation on multiple carriers (waveform signals of different frequencies).

The base stations 105 may wirelessly communicate with the mobile devices 115 via a base station antenna (not shown). The base stations 105 may communicate with the mobile devices 115 under the control of the base station controller 120 via multiple carriers. Each of the base station 105 sites may provide communication coverage for a respective geographic area. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). There may be overlapping coverage areas for different technologies.

The mobile devices 115 may be dispersed throughout the coverage areas 110. The mobile devices 115 may be referred to as mobile stations, mobile devices, access terminals (ATs), user equipments (UEs), subscriber stations (SSs), or subscriber units. The mobile devices 115 may include cellular phones and wireless communications devices, but may also include personal digital assistants (PDAs), other handheld devices, netbooks, notebook computers, etc.

The base stations 105 may allow users of the mobile devices 115 to communicate with each other. For example, a first mobile device may send electronic communications (e.g., email, text message, voicemail messages, real-time conversations associated with a phone call etc.) to a second mobile device. The mobile devices 115 may include an input device to capture an expression of a use that is sending the electronic communications. Examples of input devices may include cameras, microphones, biosensors, etc. A biosensor may include a galvanic skin response (GSR) sensor, an electrocardiogram sensor (ECG), a pulse oximeter, a thermistor or a thermopile for skin temperature, and the like. A sending mobile device 115 being used by the user creating the electronic communications may create data representing the captured expression. The data and the electronic communications may be transmitted from the sending device 115 to a receiving device 115. The receiving mobile device 115 may analyze the data to determine the emotional state of the user that created the communications. In one configuration, the receiving device 115 may generate a haptic response. The response may be associated with the received electronic communications. The receiving device 115 may also provide the electronic communications and the haptic response to a user of the receiving device 115. The haptic response may indicate the emotional state of the sending user in connection with the electronic communications. As used herein, the term "first user" may refer to a user that creates and sends electronic communications via a first mobile device. The term "second user" may refer to a user that receives and accesses the electronic communications via a second mobile device.

Figure 2:
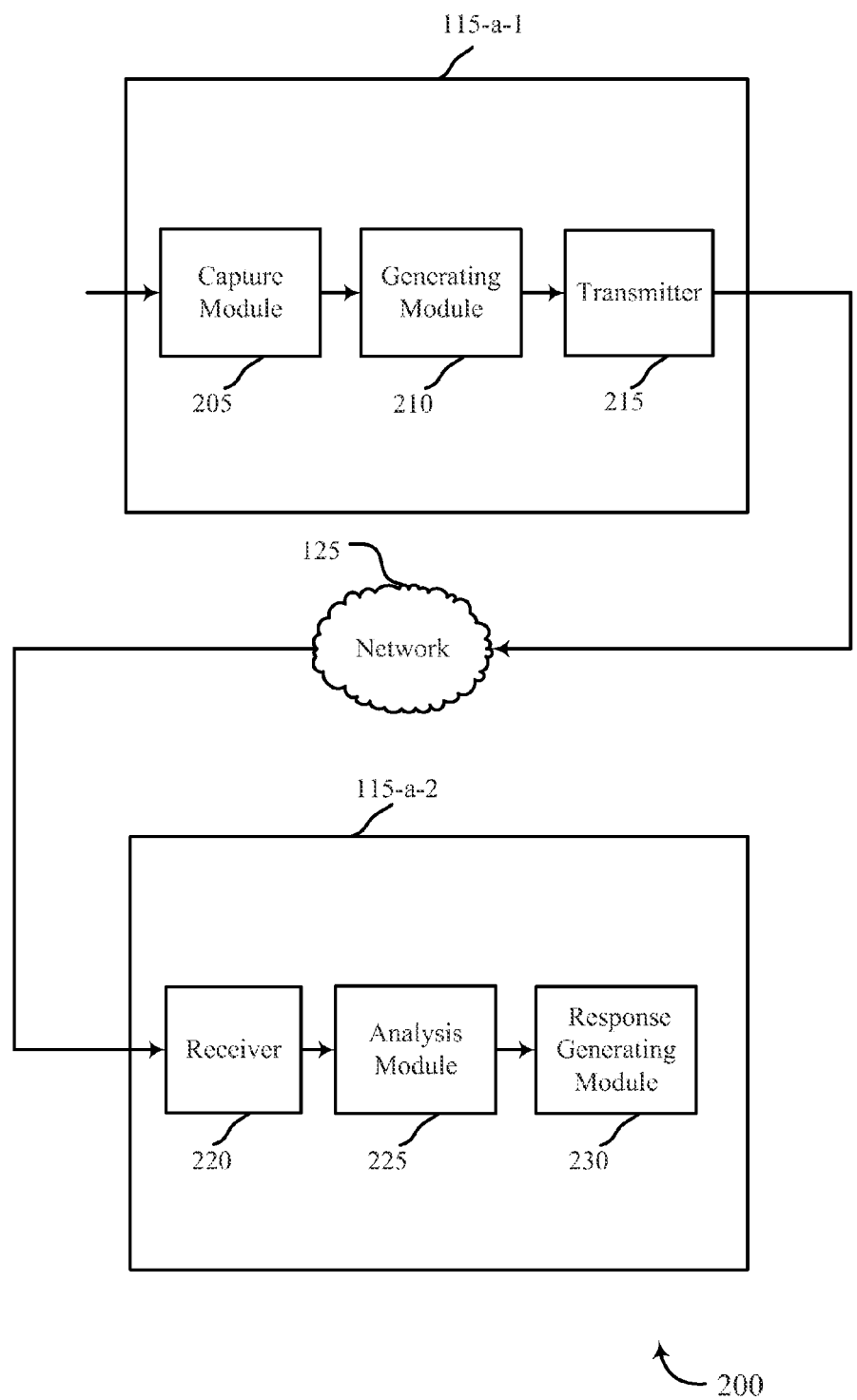
FIG. 2 is a block diagram illustrating one example of a first mobile device communicating emotional context information to a second mobile device.

FIG. 2 is a block diagram 200 illustrating one example of a first mobile device 115-a-1 communicating emotional context information to a second mobile device 115-a-2. The first mobile device 115-a-1 and the second mobile device 115-a-2 may be examples of the mobile devices 115 of FIG. 1. The devices may communicate across a network 125 connection. In one example, the emotional context information may be transmitted to the second mobile device 115-a-2 via the network 125.

The first device 115-a-1 may include a capture module 205, a generating module 210, and a transmitter 215. The second device 115-a-2 may include a receiver 220, an analysis module 225 and a response generating module 230. In one configuration, the capture module 205 may capture raw data that represents an expression of a first user (e.g., data representative of a vocal, facial, and/or other physiological expression of the first user, captured by a sensor). The raw data may indicate an emotional state of the first user with respect to an electronic communication transmitted to the second mobile device 115-a-2. The generating module 210 may analyze the raw data to generate succinct data that infers the emotional state of the first user. For example, the raw data may be interpreted and compressed and/or categorized. The transmitter 215 may transmit this data to the receiver 220 of the second mobile device 115-a-2 across the network 125.

In one configuration, the analysis module 225 may analyze the received data to determine the emotional state of the first user. The response generating module 230 may generate a response representative of the determined emotional state. In one example, the response may be linked to the electronic communications received from the first mobile device 115-a-1. In one configuration, a second user may access the electronic communications via the second mobile device 115-a-2. Examples of electronic communications may include, but are not limited to, email messages, text messages, voicemail messages, real-time telephone conversations, video messages, status updates via social networking websites, and the like. When the second user accesses the electronic communications, the response generated by the response generating module 230 may be provided to the second user. As a result, the second user may be aware of the emotional state of the first user as it relates to the particular electronic communications being accessed.

These components of each device 115 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each component may also be implemented, in whole or in part, with instructions embodied in a memory, formatted to be executed by one or more general or application-specific processors.

Figure 3:
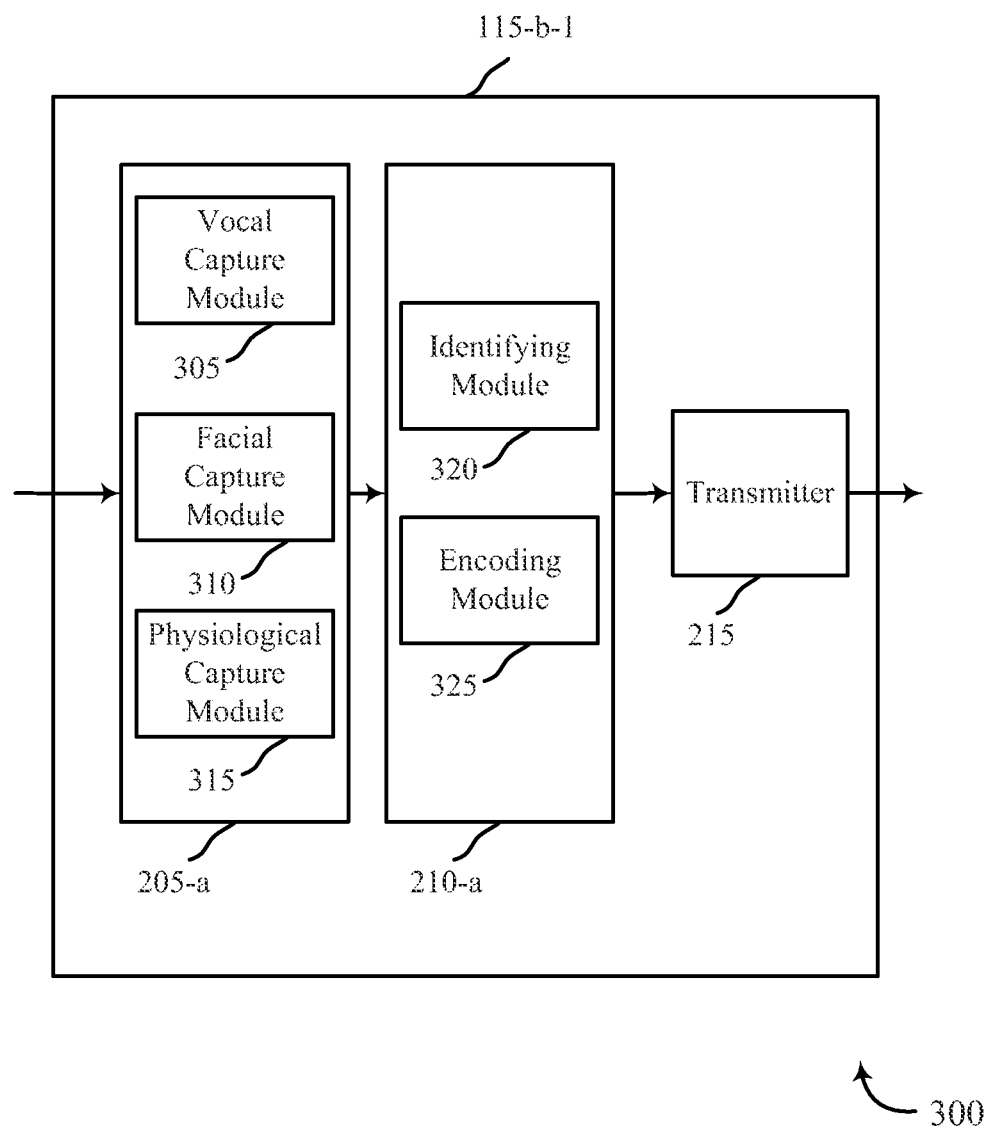
FIG. 3 is a block diagram illustrating an example of the first mobile device transmitting emotional context data.

Referring now to FIG. 3 a block diagram 300 illustrates an example of a first mobile device 115-b-1 that may transmit emotional context data. The first mobile device 115-b-1 may be an example of the mobile devices illustrated in either FIG. 1 or 2. The first mobile device 115-b-1 may include a capture module 205-a, a generating module 210-a, and a transmitter 215. The capture module 205-a may include a vocal capture module 305, a facial capture module 310, and a physiological capture module 315. In one configuration, the capture module 205-a may capture an expression of a first user. For example, the vocal capture module 305 may capture a vocal expression from the first user. The module 305 may include a microphone or other vocal input device to capture the vocal expression of the first user. The facial capture module 310 may capture facial expressions manifested from the user. In one example, the facial capture module 310 may include a camera or other input device to capture the facial expressions. The physiological capture module 315 may capture physiological data, such as, but not limited to, GSR data, heart rate, skin temperature, etc. of the first user. The module 315 may include biosensors to capture this data.

In one configuration, the generating module 210-a may receive the captured data and generate one or more indicators that represent the captured data. For example, the generating module 210-a may include an identifying module 320 and an encoding module 325. The identifying module may analyze the captured data and identify one or more indicators to represent the captured data. For example, the identifying module 320 may analyze the vocal data by examining the prosody, speech rate, volume, etc. of the vocal expressions. The identifying module 320 may analyze the facial expressions by mapping the facial structure and by using action units to determine the movement of the facial muscles. The analysis may include performing feature extraction and pattern classification on the expression data captures by a biosensor, camera, microphone, etc. Feature extraction from data captured by biosensors may include extracting data relating to heart rate, heart rate variability, GSR responses, skin temperature, and the like. Pattern classification may be performed via k-Nearest Neighbor, Neural Nets, Naïve Bayesian classifiers, etc. The analysis of the expressions may be used to determine information indicative of the first user's emotional state.

The identifying module 320 may identify one or more indicators that represent the analyzed captured data. For example, the identifying module 320 may identify an arousal level indicator and a valence level indicator based on the analysis of the data. In other words, a capture device (sensor, camera, microphone, etc.) may capture a raw measurement of a signal (e.g., skin conductance from a GSR sensor) representing an expression. Feature extraction techniques may be performed (e.g., skin conductance), and pattern classification may be performed with other extracted features. The arousal level indicator and the valence level indicator may be determined based on the feature extraction and pattern classification. These indicators may provide an indication of the emotional state of the first user. The arousal level indicator may be, for example, an integer on a scale of 1-10 (while noting that a number of other indicator types/schemes are contemplated). In one configuration, the arousal level indicator may indicate a level of intensity determined from the captured expression of the user. The valence level indicator may also be, for example, an integer on the scale of 1-10. This indicator may represent a level of pleasure determined from the expression of the user. As an example, a "10" may represent a high arousal or valence level while a "1" represents low levels. In one example, the identifying module 320 may also identify a time indicator that indicates a time period that the identified arousal level and valence level are manifested.

The encoding module 325 may encode the indicators representing the raw data captured by the capture module 205-*a*. For example, the encoding module 210-*a* may encode the arousal level indicator and the valence level indicator as integers on the scale between 1-10. The encode module 325 may also encode the time indicator representing the time period the user experienced the indicated arousal and valence levels. The transmitter 215 may transmit the encoded data to a receiving mobile device.

Figure 4:
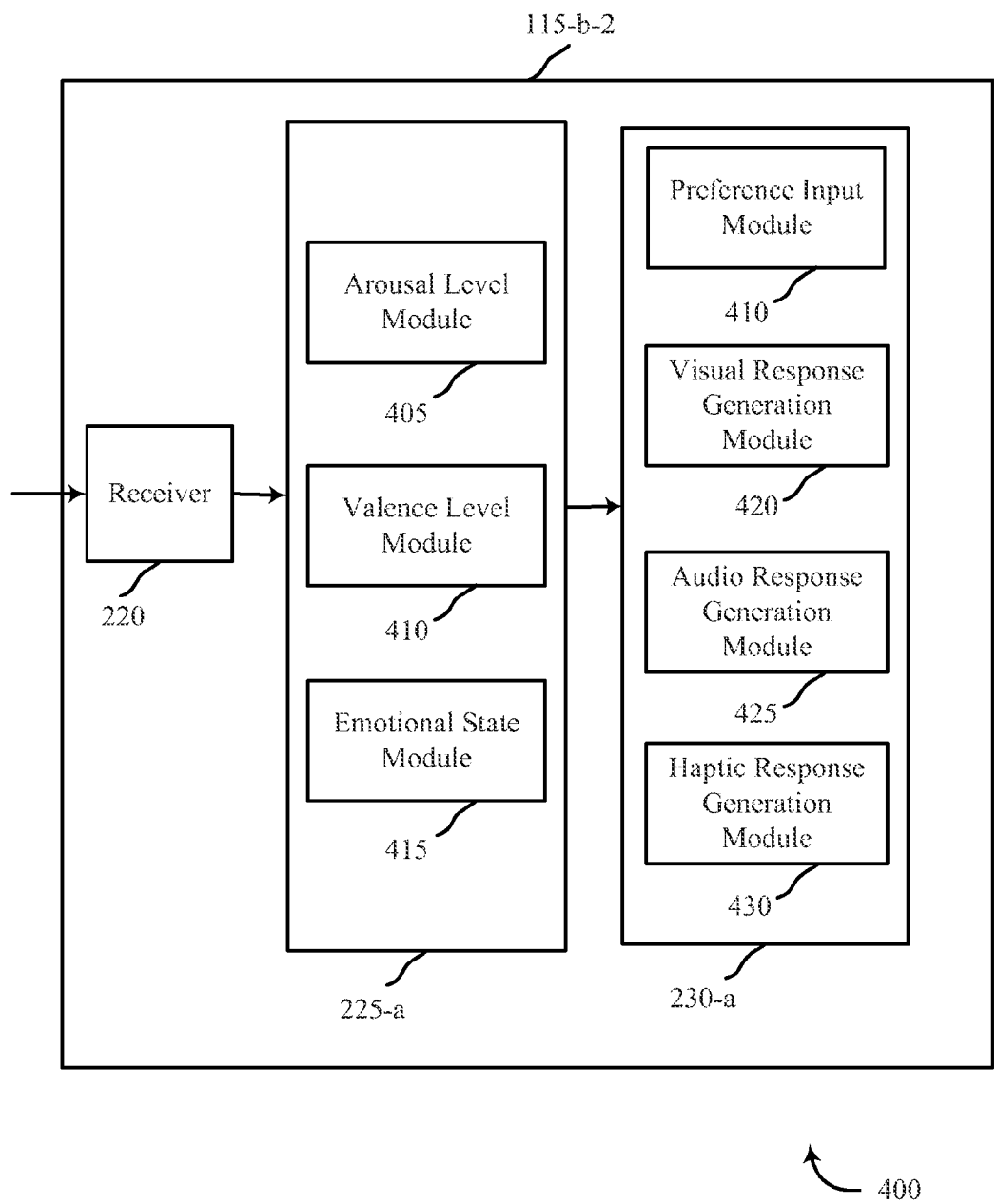
FIG. 4 is a block diagram illustrating one example of the second mobile device receiving the emotional context data.

FIG. 4 is a block diagram 400 illustrating one example of a second mobile device 115-*b*-2 that may receive emotional context data. The second mobile device 115-*b*-2 may be an example of the mobile devices 115 illustrated in either FIG. 1, 2 or 3. The device 115-*b*-2 may include a receiver 220, an analysis module 225-*a*, and a response generating module 230-*a*. The receiver 220 may receive encoded data from the first mobile device 115-*b*-1. The analysis module 225-*a* may analyze the encoded data to determine an emotional state of the first user. In one configuration, the analysis module 225-*a* may include an arousal level module 405, a valence level module 410, and an emotional state module 415. The arousal level module 405 may analyze the encoded data to extract the arousal level indicator that represents the arousal level of the first user. The valence level module 410 may analyze the data to extract the valence level indicator that indicates the valence level of the first user. As previously described, the arousal level indicator and the valence level indicator may be an integer. As an example, the arousal level module 405 may extract the integer "2" representing the arousal level indicator. The valence level module 410 may analyze the data to extract the integer "1" representing the valence level indicator. In this example, the arousal integer "2" may indicate that the first user experienced a level of low intensity while creating the electronic communications. The valence integer "1" may indicate that the user experienced a level of low pleasure while creating the communications. The emotional state module 415 may determine an emotional state of the first user based on the arousal level indicator and the valence level indicator. In one example, the module 415 may be include a look-up table to translate a particular arousal and valence level indicator to an emotional label. In the example above, the emotional state module 415 may translate the arousal integer of "2" and the valence integer of "1" to a label representing the emotional state of the user. The label for this example may be "sad", "depressed", etc. (e.g., low intensity and low pleasure).

The response generating module 230-*a* may include a preference input module 410, a visual response generation module 420, an audio response generation module 425, and a haptic response generation module 430. In one configuration, the response generating module 230-*a* may generate a response indicative of the determined emotional state of the first user. The generated response may be provided to a second user via the second mobile device 115-*b*-2. The response may be provided together with the electronic communications created by the first user and received from the first device 115-*b*-1. For example, the visual response generation module 420 may generate a visual response for certain forms of electronic communications (e.g., emails, text messages, video messages, etc.) that indicates the emotional state of the first user. Examples of visual responses may include, but are not limited to, a background color applied to the electronic communications, text displayed with the communications, a border color included with the electronic communications, an image displayed with the electronic communications, an animated avatar linked to the electronics communication, etc.

The audio response generation module 425 may generate an audio response for certain types of electronic communications that indicate the emotional state of the first user. Examples of audio responses may include, but are not limited to, beeps, cues, audible text, and the like. The audio response may be linked to the electronic communications created by the first user. The haptic response generation module 430 may generate haptic responses that represent the emotional state of the first user. Examples of haptic responses may include temperature, vibrations, pressure, tapping, texture, and the like. The second user may receive the response generated by the module 230-*a* concurrently with receiving the electronic communications created by the first user. As a result, the electronic communications may be augmented with emotional context. The recipient of the electronic communications may better understand the emotional state of the party that sent the electronic communications. The response generating module 230-*a* may also generate responses in real-time. Thus, participants in real-time communications, (e.g., phone calls) may become aware of the real-time emotional state of the other party via the generated responses during the communications.

In one configuration, the preference input module 410 may receive input from second user. The input may include preferences of the second user relating to which response(s) to generate for different types of electronic communications. For example, the second user may desire to generate haptic-based responses for certain electronic communications (e.g., phone calls, voicemails, etc.) and visual responses for other types of communications (e.g., emails, text messages, etc.) The preference input module 410 may also allow the second user to select whether to generate multiple types of responses for electronic communications. For example, the second user may desire to generate haptic-based responses in combination with audio responses for certain electronic communications. The preference input module 410 may also allow the second user to select the type of response to generate based on the location of the mobile device 115-*b*-2, the level of background noise present at the mobile device 115-*b*-2, and the like.

The response generating module 230-*a* may further generate and provide a response in synch with an electronic communication. The synchronization may be achieved by using the time indicator extracted by the analysis module 225-*a*. For example, the second mobile device 115-*b*-2 may receive and store a voicemail (or other type of electronic communication) at a first time period. The analysis module 225-*a* may determine the emotional state of sending party at the time the voicemail was originated. The determined emotional state may be linked to the stored voicemail. At a second time period, the receiving party may access the stored voicemail. The response generating module 230-*a* may generate a response representing the previously determined emotional state of the sending party. The response may be provided to the receiving party while he/she is listening to the voicemail. As an example, the response may include an animated avatar. The avatar may be animated during the playback of the voicemail to portray the emotional state of the sender of the voicemail. As another example, the response may be a haptic-based response. For example, if the emotional state of the sender of the voicemail is "anger", the second mobile device 115-*b*-2 may heat up during the playback of the voicemail. As a result, the receiving party is aware of the emotional state of the sending party at the time the voicemail was created. Additional examples of various types of electronic communications and the possible responses that may be generated and associated with the communications are provided below. The various examples below may refer to the examples of the mobile devices described in FIG. 1, 2, 3, or 4. Other types of electronic communications, in addition to those described below, may also be used with the present systems and methods.

Telephone call: As mentioned above, users of the mobile devices 115 may engage in real-time telephone calls. In one configuration, the physiological capture module 315 on the first mobile device 115-*b*-1 may capture physiological input from the first user. For example, biosensors on the first mobile device 115-*b*-1 may monitor emotional context of the first user during the call. Additional expressions of the first user may also be captured with the physiological input. For example, the vocal capture module 305 may capture vocal expressions and perform vocal expression recognition as a secondary input to the physiological input. Arousal and valence level indicators may be identified from the captured data and transmitted to the second mobile device 115-*b*-2.

The analysis module 225-*a* of the second device 115-*b*-2 may analyze the arousal and valence level indicators to determine an emotional state of the first user. The determined emotional context may be conveyed to the second user of the second mobile device 115-*b*-2 via a haptic response, for example. The response may be provided in the form of heat using a Peltier element. Other forms of haptic responses may also be used such as, but not limited to, vibration bursts. Additional response may also be used together with the haptic response. For example audible cues may be generated. The audible cues may be chimes that indicate when the first user changes emotional state. For example, if the first user is upset or aroused, the second mobile device 115-*b*-2 may begin to warm up. Audible chimes of a particular frequency, intensity, or duration may also be provided to convey the emotional context of the first user. If the first user becomes calmer during the telephone call, the second device 115-*b*-2 may start to cool down. A short audible chime may also be provided indicating this change in the emotional state of the first user. If the haptic-based response includes vibrations, the vibration intensity, duration, and frequency may vary depending on the first user's emotional state. For hands free calls, a visual response (e.g., an image or background color) may be provided to contextualize the first user's emotional state. As a result, the second user (or receiving party) may deduce the emotional state of the first user (or the sending party) by touching the second mobile device 115-*b*-2, hearing audible cues, and/or viewing a visual response that represent the emotional status of the first user.

Writing/Reading a text message: Examples of the text message may include an email message, a short message service (SMS) message, a post to a social networking website, an instant messaging (IM) message, and the like. For example, the first user may compose a text message. Facial features/expressions of the first user may be captured via the facial capture module 310. The physiological capture module 315 may also capture physiological information about the first user. Arousal and valence level indicators may be identified from the captured expressions. The indicators may be encoded as integers, for example, and transmitted to the second device 115-*b*-2. The second device 115-*b*-2 may determine the emotional context of the first user from the encoded integers. The response generating response module 230-*a* may generate a response to represent the emotional state of the first user. For example, the visual response generation module 420 may generate an image corresponding to the emotional state of the first user. The image may include an avatar image, a background color for the message, or border color for the message. The image may be provided to the second user when the text message is viewed.

In another example, the first user's facial expression may be captured in real-time as the first user writes the message. An animated avatar may be provided to the second user when the message is viewed. In another example, the animated avatar (or other abstract image) may move in sync with a text-to-speech system as the message is being read to the second user.

Recording/Listening to a voicemail message: Vocal expression recognition (and perhaps biosensor data) may be used to capture emotional state information when the first user records a voicemail message. The captured information may be condensed to arousal and valence level indicators by encoding the information as integers representing these levels. The encoded information may be transmitted to the second device 115-*b*-2. The encoded information indicating the arousal and valence level of the first user may be conveyed as metadata to a voicemail message inbox of the second user. When the second user accesses the inbox to listen to the message, the encoded data may be rendered as a haptic response on the second device 115-*b*-2, such as heat or vibration. Audible cues may also be used to provide the second user with the emotional context of the first user while the voicemail message was recorded.

Incoming call/message notification: In one example, when the first user places a call, facial expressions and/or physiological data may be captured to determined the emotional state of the first user. Metadata representing the current and/or past emotional state of the first user may be sent to the second mobile device 115-*b*-2. The response generating module 230-*a* may render the metadata as a visual image reflecting the emotional status of the first user. The visual image may include a background color being displayed on a display section of the second mobile device 115-b-2, an avatar image, or some other image to convey the emotional state of the first user. For example, a fire image may be displayed to represent an "angry" emotional state of the first user. The metadata may also be rendered as a haptic response and/or an audio response. These responses may vary the intensity, frequency, and/or duration to cue the second user as to the emotional status of the first user. The generated responses may be provided when the second user is notified of an incoming call from the first user's device. The second user may use the responses to decide whether or not to answer the incoming call or message from the first user.

Logged calls, messages, voicemails: In one example, a call, message, or voicemail originating from the first user may be missed by the second user. The second mobile device 115-b-2 may log missed electronic communications. In one configuration, a response may be generated, as described above, by the response generating module 230-a and logged with the missed communications. For example, a static image may be generated that represents the emotional status of the first user when the call or voicemail was made or when the message was sent. The response may be provided to the second user when the second user accesses information regarding the logged communications.

Real-time status: In one configuration, the first user may wear biosensors to yield real-time streaming emotional status. The real-time emotional context may be rendered using visual images, haptic-based responses, and/or audible cues to augment electronic information. For example, a profile of the first user on a social networking website may be updated in real-time with the emotional status of the first user. Viewers of the first user's profile may be aware of the emotional state of the first user in real-time via the generated responses. Similarly, profiles of people in an electronic address book may also be updated in real-time with their current emotional status. As a result, the owner of the electronic address book may know in real-time the emotional status of the individuals included in his/her electronic address book.

Networked gaming: Networked gaming environments may also convey the emotional status of participating users to enhance game play and communications between networked parties. Basic emotional status may be determined via facial expressions, biosensors, and/or vocal expressions. The emotional status may be logged and rendered as a gaming avatar facial expression to mimic the user that provided the expressions. Other responses may also be generated as described above to represent the emotional status of the users.

Video call, video chat, or video conference: Although contextual modalities of the first user are typically present during a video call (i.e., words, vocal expressions, facial expressions) for the second user to see, additional emotional context may be used to emphasis the emotional state of the first user. For example, a border may be generated around the first user during the video call that changes color synchronously with his/her emotional state. Haptic-based responses may also be generated to indicate the emotional status of the first user. For example, haptic-based responses may be generated when the second device 115-b-2 includes a relatively small display screen that increases the difficulty of the second user to accurately interpret the facial expressions of the first user during the video call.

Figure 5:
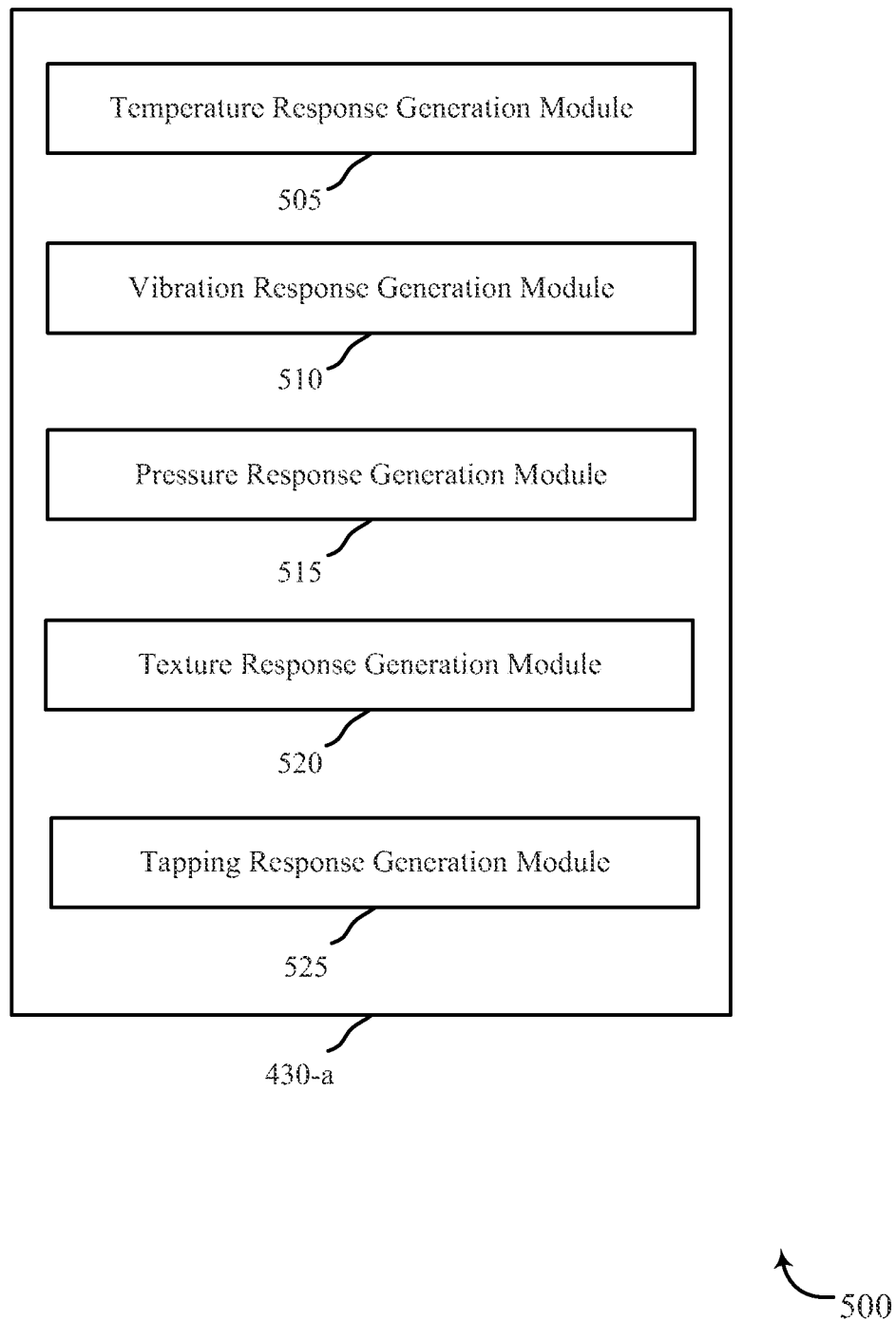
FIG. 5 illustrates one example of a haptic response generating module.

FIG. 5 is a block diagram 500 illustrating one example of a haptic response generating module 430-a. The module 430-a may be an example of the module 430 of FIG. 4. The haptic response generating module 430-a may be implemented in the mobile device 115 of FIG. 1, 2, 3, or 4. In one configuration, the module 430-a may include a temperature response generation module 505, a vibration response generation module 510, a pressure response generation module 515, a texture response generation module 520, and a tapping response generation module 525. The various modules may be used to create a different type of haptic-based response to represent an emotional state of a user.

In one example, the temperature response generation module 505 may generate a haptic response that causes the temperature of a mobile device 115 to change based on the emotional status of a user. For example, as the first user's GSR level (or the rate of GSR responses) increases (as detected by the first mobile device 115-b-1), the temperature of the second mobile device 115-b-2 may increase linearly. As a result, the second user, while holding the second mobile device 115-b-2, may perceive an increase or decrease in the temperature of the device 115-b-2. The change in temperature may indicate the corresponding emotional status of the first user. A temperature-based haptic response may be generated using Thermoelectric Coolers (TEC) or Peltier elements to shift the temperature of the back and/or sides of the second mobile device 115-b-2 that are in contact with the skin of the second user.

In one configuration, the vibration response generation module 510 may generate a haptic response using vibrations rendered on a receiving device. Human perception of vibration is approximately between 100 Hz and about 1 kHz. The peak perception may be around 250 Hz. The module 510 may alter the properties of a vibration (e.g., amplitude, frequency, and duration) depending on the first user's GSR level or number of GSR responses. Vibrations may be used to indicate a change in emotion indicated by a short vibration burst rather than a continuously changing vibration. The module 510 may use the following actuators to produce vibration-based haptic response: Eccentric Rotating Mass (ERM), Linear Resonant Actuator (LRA), Multi-Function Actuator (MFA), and Piezoelectric actuators.

The following examples illustrate the use of vibration-based responses that may be generated by the vibration response generation module 510. For example, during the course of a phone conversation the first user's arousal and/or valence levels may increase over a given threshold, as detected by the first mobile device 115-b-1. The second mobile device 115-b-2, used by the second user, may vibrate a short burst with a high amplitude vibration that is close to peak human sensitivity (250 Hz) to indicate anger/excitement of the first user. If, on the other hand, the first user's arousal and/or valence levels decreases below a given threshold, the second mobile device 115-b-2 may vibrate a short burst with a lower amplitude vibration that may be higher in frequency to indicate a calm state of the first user.

The pressure response generation module 515 may generate a haptic response using pressure techniques. For example, the module 515 may include an Electro-active Polymer (EAP) actuator that exerts cutaneous force on the hands/fingers of a user. The material of the actuator may be used in several ways. For example, the EAP may be placed on the back and/or sides of a device. The actuator may render pressure on the skin of the second user holding the device when the arousal and/or valence levels of the first user increase. The actuator material may be a single large strip that may produce normal pressure on the hands of the second user (e.g., the material may expand/contract when the first user's arousal and/or valence levels increase/decrease).

In one example, the texture generation module 520 may generate a texture-based haptic response. Humans may perceive about 2 micrometers of deformation without use of tactile scanning and down to about 0.07 micrometers with tactile scanning Humans typically perceive texture via lateral scanning with the finger tip. The EAP actuator may be used as a series of small dots distributed on the back and/or sides of a device that individually expand to create a rough texture on the back and/or sides when arousal and/or valence levels are high. The dots may become smooth when the user is calm. Other methods to render texture may also be used such as piezoelectric elements bonded to a surface which may vary the coefficient of friction of the surface via ultrasonic vibration of the element controlled from input voltage. Such an element may be placed on the side and/or back of a device. Coefficients that control the friction of the actuator may be varied depending on the emotional status of a user. For example, the device could become rougher/smoother with varying emotional states.

The tapping response generation module 525 may be used to generate a haptic response based on a tapping sensation. Human perception of taps is under approximately 20 Hz. Taps may increase in frequency (or increase in amplitude) as arousal and valence levels increase. The taps may become less frequent (or decrease in amplitude) as arousal and valence levels decrease. Cutaneous haptic actuation of the taps may be delivered by using the EAP actuator on the sides and/or back of a device that oscillates cutaneous pressure according to the arousal and valence patterns of a user. In addition, a linear motor force feedback actuator may be included in the module 525 to deliver a more forceful kinesthetic tapping response.

Figure 6:
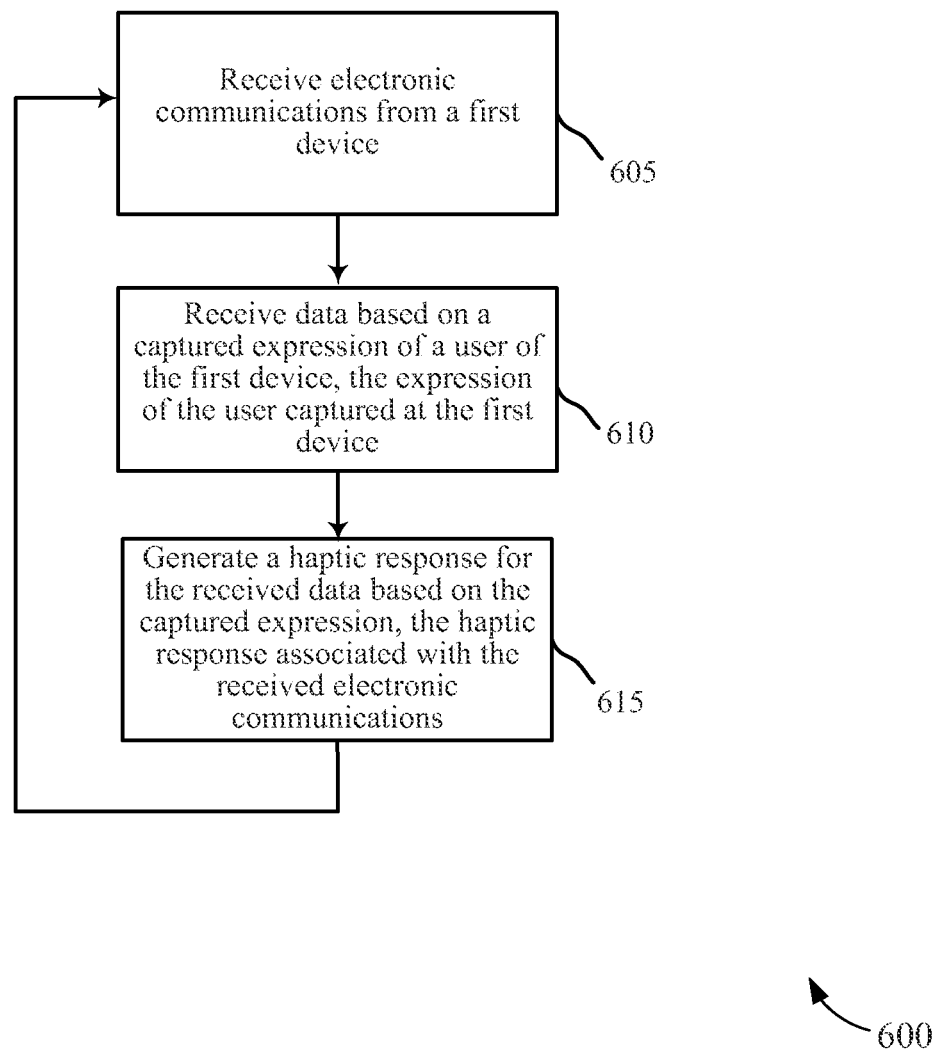
FIG. 6 is a flow chart illustrating one example of a method to enhance electronic communications with emotional context.

Referring now to FIG. 6, a method 600 is illustrated to enhance electronic communications with emotional context. The method 600 may be implemented by the mobile device 115 of FIG. 1, 2, 3, or 4. In one example, the method 600 may be implemented by the receiver 220, the analysis module 225, and the response generating module 230.

At block 605, electronic communications may be received from a first device. For example, communications may be received from the first mobile device 115-*b*-1. The communications may include a phone call, a text message, a voicemail message, a video message, an email, and the like. At block 610, data based on a captured expression of a first user of the first device 115-*b*-1 may be received. The expression of the first user may be captured at the first mobile device 115-*b*-1. In one configuration, at block 615, a haptic response based on the received data may be generated. The haptic response may be associated with the received electronic communications. During the playback of the electronic communications, the haptic response may be provided to augment the communications with emotional context.

Thus, the method 600 allows the mobile device 115 to enhance electronic communications with emotional state information of the user that originated the communications. It should be noted that the method 600 is just one implementation and that operations of the method 600 may be rearranged or otherwise modified such that other implementations are possible.

Figure 7:
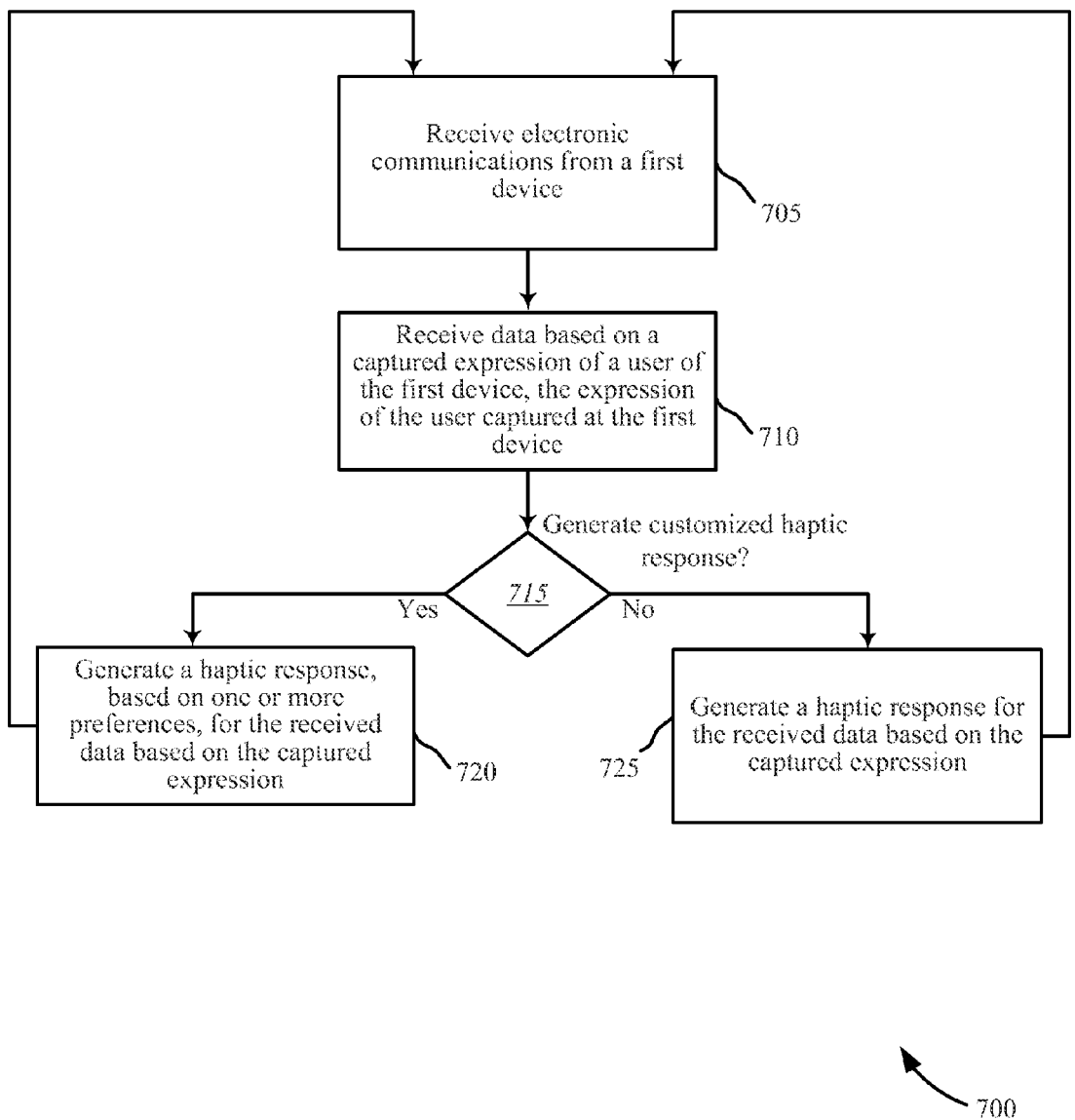
FIG. 7 is a flow chart illustrating one example of a method to determine a type of haptic response to generate.

FIG. 7 is a flow chart illustrating one example of a method 700 to determine a type of haptic response to generate. The method 700 may be performed by the mobile device 115 of FIG. 1, 2, 3, or 4. In one example, the method may be performed by the receiver 220, the analysis module 225, and the response generating module 230.

At block 705, electronic communications may be received from the first mobile device 115-*b*-1. At block 710, data based on a captured expression of the user of the first device (the first user) may be received. The expression may be captured at the first mobile device 115-*b*-1. At block 715, a determination may be made as to whether a customized haptic response should be generated. For example, user preferences may be analyzed to determine whether a user prefers a certain type of haptic response. The preferences may also be analyzed to determine whether a particular type of response should be generated based on the type of electronic communications received from the first device 115-*b*-1. If it is determined that a customized haptic response is not to be generated, at block 725, a default haptic response may be generated for the received data that is based on the captured expression of the first user. If, however, it is determined that a customized haptic response is to be generated, a response, at block 720, may be generated based on one or more user preferences. After generating a default or customized haptic response, the method 700 may return to receive communications from the first device 115-*b*-1.

Thus, the method 700 allows the mobile device 115 to enhance electronic communications with emotional state information of the user that originated the communications by augmenting the communications with a specific haptic response. It should be noted that the method 700 is just one implementation and that operations of the method 700 may be rearranged or otherwise modified such that other implementations are possible.

Figure 8:
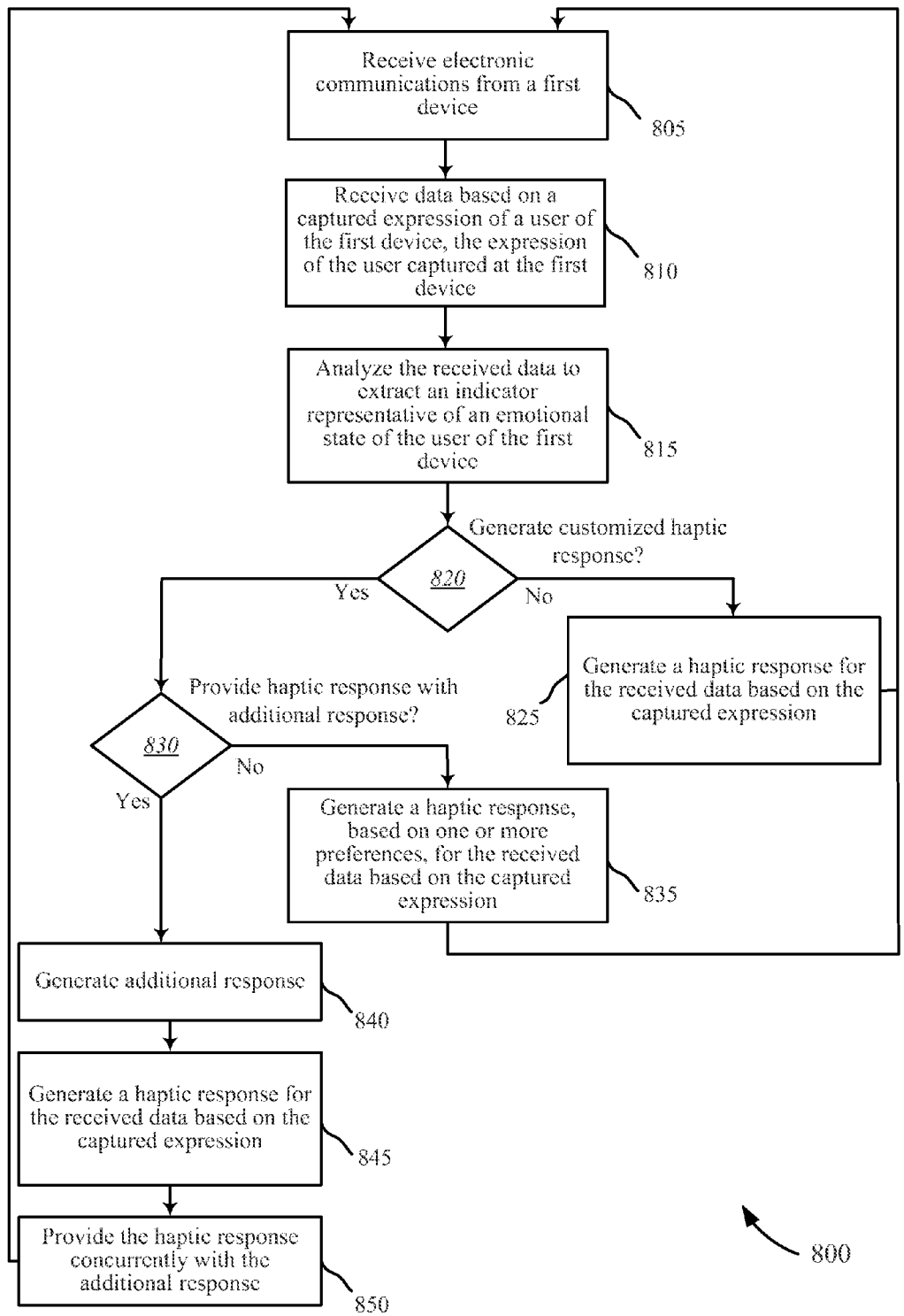
FIG. 8 is a flow chart illustrating a further example of a method to enhance electronic communications with emotional context.

FIG. 8 is a flow chart illustrating a further example of a method 800 to enhance electronic communications with emotional context. The method 800 may be performed by the mobile device 115 of FIG. 1, 2, 3, or 4. In one example, the method may be performed by the receiver 220, the analysis module 225, and the response generating module 230.

At block 805, electronic communications may be received from the first mobile device 115-*b*-1. At block 810, data based on a captured expression of a first user of the first device may be received. The expression may be captured at the first mobile device 115-*b*-1. At block 815, the received data may be analyzed to extract one or more indicators representative of an emotional state of the first user. The indicators may be integers between 1-10 that indicate an arousal level and a valence level of the first user. The emotional status of the first user may be determined based on the extracted one or more indicators.

At block 820, a determination may be made as to whether a customized haptic response should be generated. If it is determined that a customized haptic response is not to be generated, at block 825, a default haptic response may be generated. If, however, it is determined that a customized haptic response is to be generated, at block 830, a determination may be made as to whether additional responses should be generated with the haptic response. If it is determined that no additional response are generated, at block 835, a haptic response may be generated based on one or more user preferences. If, however, it is determined that additional responses should be generated, at block 840, an additional response may be generated. The additional response may include a visual response and/or an audible response. At block 845, a haptic response may be generated. At block 850, the haptic response and the additional response may be provided concurrently to a second user of the second mobile device 115-*b*-2. The second user may use the generated responses to become aware of the current and/or past emotional state of the first user in connection with the received electronic communications. After generating the response(s), the method 800 may return to receive communications from the first device 115-*b*-1.

Thus, the method 800 allows the mobile device 115 to enhance electronic communications with emotional state information of the user using one or more responses that represent the emotional status of a user. It should be noted that the method 800 is just one implementation and that operations of the method 800 may be rearranged or otherwise modified such that other implementations are possible.

Figure 9:
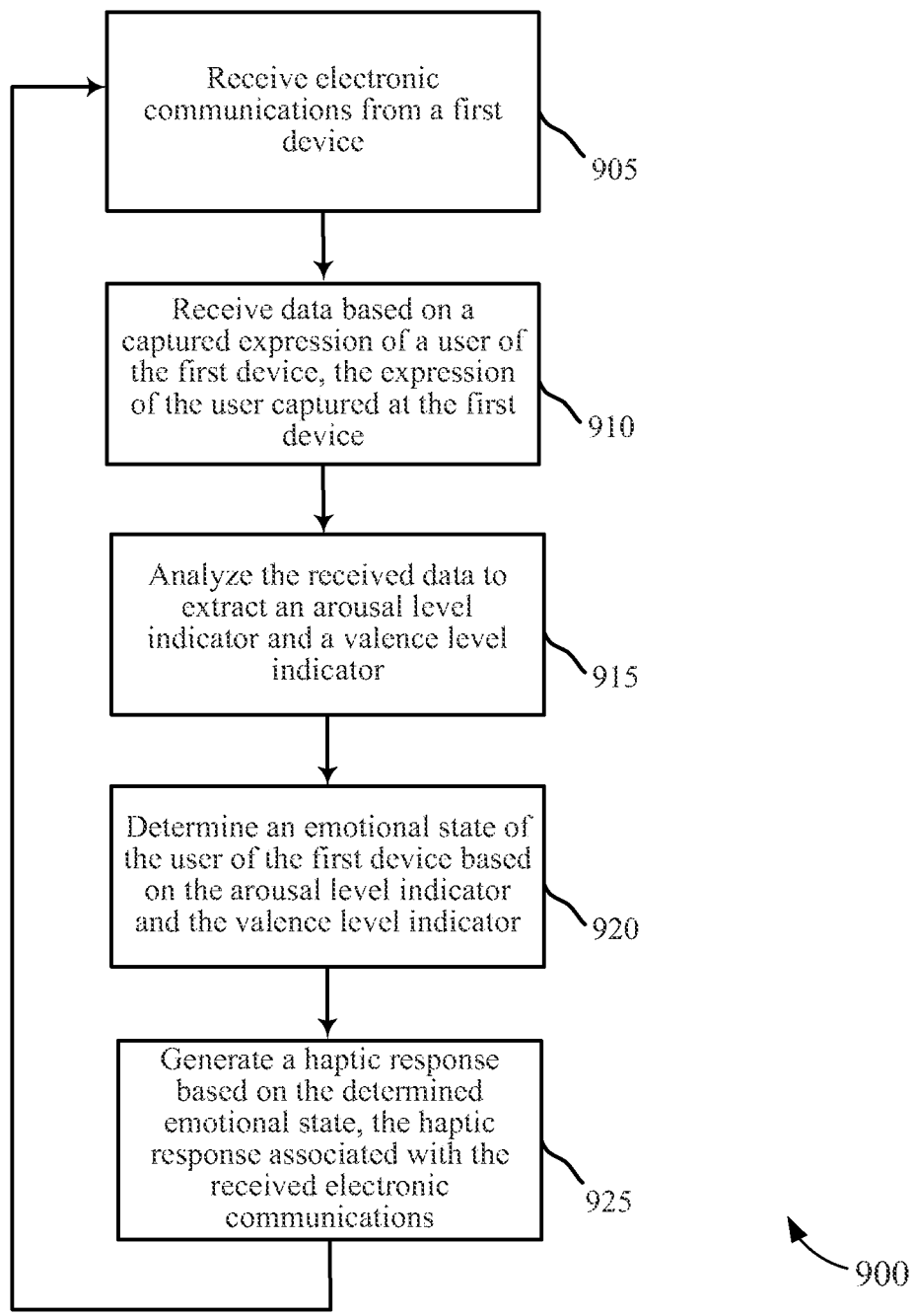
FIG. 9 is a flow chart illustrating one example of a method to determine an emotional state of a user based on an arousal level and a valence level of the user.

Referring now to FIG. 9, a method 900 is provided to determine an emotional state of a user based on an arousal level and a valence level of the user. The method 900 may be performed by the mobile device 115 of FIG. 1, 2, 3, or 4. In one configuration, the method 900 may be implemented by the receiver 220, the analysis module 225, and the response generation module 230.

At block 905, electronic communications may be received from a first device, such as the first mobile device 115-*b*-1. At block 910, data based on a captured expression of a first user of the first device may be received. The expression of the first user may be captured at the first device. At block 915, the data may be analyzed to extract an arousal level indicator and a valence level indicator. The indicators may be integers that represent the arousal level and the valence level of the first user. At block 920, an emotional state of the first user may be determined based on the arousal level indicator and the valence level indicator. At block 925, a haptic response may be generated based on the determined emotional state of the first user. The haptic response may be associated or linked with the received electronic communications.

Thus, the method 900 allows the mobile device 115 to determine an emotional state of a user based on the arousal level and valence level of the user. It should be noted that the method 900 is just one implementation and that operations of the method 900 may be rearranged or otherwise modified such that other implementations are possible.

As described above, the mobile device 115 may capture expressions of a user and identify certain features from the expressions to determine an arousal level and a valence level of the user. Indicators may be encoded that represent the determined levels. In one example, the indicators may be transmitted to another mobile device 115 with electronic communications. The other mobile device 115 may analyze the indicators to determine an emotional state of the user. When the electronic communications are accessed on the other mobile device 115, a haptic response may be generated to represent the determined emotional state. As a result, electronic communications may become augmented with emotional context. The recipient of such electronic communications may become aware of an accurate emotional status of the originator of the communications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method to enhance electronic communications with emotional context, comprising:
   receiving electronic communications from a first device, the electronic communications comprising data associated with an expression of a user captured at the first device, the captured expression comprising a facial expression or physiological data, the received electronic communications further comprising:
   an emotional indicator representative of an emotional state of the user of the first device, wherein the emotional indicator comprises an arousal level and a valence level, each associated with the captured expression of the user of the first device; and
   a time indicator representative of a real-time emotional state of the user of the first device, the time indicator indicating a time period during which the emotional state of the user is manifested;
   analyzing the data associated with the expression of the user to extract the emotional indicator and the time indicator;
   generating a haptic response for the received electronic communications based on the emotional state of the user corresponding to the extracted emotional indicator and based on at least one preference selected by a user of a second device that receives the electronic communications from the first device, the at least one selected preference for generating the haptic response based on a location of the second device; and
   synchronizing the generation of the haptic response with a playback of the received electronic communications using the extracted time indicator, the haptic response associated with the received electronic communications.

2. The method of claim 1, wherein, the arousal level indicates a level of intensity associated with the captured expression of the user of the first device.

3. The method of claim 1, wherein, the valence level indicates a level of pleasure associated with the captured expression of the user of the first device.

4. The method of claim 1, further comprising:
   analyzing the data associated with the expression of the user to extract a plurality of emotional indicators, each extracted emotional indicator representative of the emotional state of the user of the first device at each of a plurality of different time periods;
   determining the emotional state of the user of the first device based on each of the extracted emotional indicators; and
   generating a plurality of haptic responses, each haptic response representative of one of the determined emotional states.

5. The method of claim 1, further comprising:
   generating an image in response to the data associated with the expression of the user based on the captured expression of the user of the first device; and
   displaying the generated image concurrently with the generated haptic response, the image and the haptic response representative of the emotional state of the user of the first device.

6. The method of claim 1, further comprising:
   generating an audio cue in response to the data associated with the expression of the user based on the captured expression of the user of the first device; and
   outputting the generated audio cue concurrently with the generated haptic response, the audio cue and the haptic response representative of the emotional state of the user of the first device.

7. The method of claim 1, wherein the at least one selected preference is further for generating the haptic response based on a type of the electronic communications received from the first device.

8. The method of claim 1, wherein the at least one selected preference is further for generating the haptic response based on a level of detected background noise at the second device.

9. The method of claim 1, wherein the haptic response comprises:
   a temperature-based haptic response;
   a vibration-based haptic response;
   a pressure-based haptic response;
   a texture-based haptic response; or
   a tapping-based haptic response.

10. The method of claim 1, wherein, the arousal level and the valence level each comprise a numerical value.

11. The method of claim 10, wherein, the arousal level and the valence level each comprise an integer.

12. The method of claim 1, further comprising:
    detecting a change in at least one of the arousal level and the valence level;
    wherein generating the haptic response for the received electronic communications is further based on the detected change.

13. The method of claim 12, wherein detecting the change in at least one of the arousal level and the valence level comprises determining an increase over a given threshold.

14. The method of claim 12, wherein detecting the change in at least one of the arousal level and the valence level comprises determining a decrease below a given threshold.

15. A device to enhance electronic communications with emotional context, comprising:
    a receiver configured to receive electronic communications from a first device, the electronic communications comprising data associated with an expression of a user captured at the first device, the captured expression comprising a facial expression or physiological data, the received electronic communications further comprising:
    an emotional indicator representative of an emotional state of the user of the first device, wherein the emotional indicator comprises an arousal level and a valence level, each associated with the captured expression of the user of the first device; and a time indicator representative of a real-time emotional state of the user of the first device, the time indicator indicating a time period during which the emotional state of the user is manifested;

an analysis module configured to analyze the received data associated with the expression of the user to extract the emotional indicator and the time indicator;

a response generation module configured to generate a haptic response for the received electronic communications based on the emotional state of the user corresponding to the extracted emotional indicator and based on at least one preference selected by a user of a second device that receives the electronic communications from the first device, the at least one selected preference for generating the haptic response based on a location of the second device; and the response generation module further configured to synchronize the generation of the haptic response with a playback of the received electronic communications using the extracted time indicator, the haptic response associated with the received electronic communications.

16. The device of claim 15, wherein,
the arousal level indicates a level of intensity associated with the captured expression of the user of the first device.

17. The device of claim 15, wherein,
the valence level indicates a level of pleasure associated with the captured expression of the user of the first device.

18. The device of claim 15, wherein,
the analysis module is further configured to:
analyze the data associated with the expression of the user to extract a plurality of emotional indicators, each extracted emotional indicator representative of the emotional state of the user of the first device at each of a plurality of different time periods;
determine the emotional state of the user of the first device based on each of the extracted emotional indicators; and
the response generating module is further configured to generate a plurality of haptic responses, each haptic response representative of one of the determined emotional states.

19. The device of claim 15, wherein,
the response generating module is further configured to:
generate an image in response to the data associated with the expression of the user based on the captured expression of the user of the first device; and
display the generated image concurrently with the generated haptic response, the image and the haptic response representative of the emotional state of the user of the first device.

20. The device of claim 15, wherein,
the response generating module is further configured to:
generate an audio cue in response to the data associated with the expression of the user based on the captured expression of the user of the first device; and
output the generated audio cue concurrently with the generated haptic response, the audio cue and the haptic response representative of the emotional state of the user of the first device.

21. The device of claim 15, wherein,
the at least one selected preference is further for generating the haptic response based on a type of the electronic communications received from the first device.

22. The device of claim 15, wherein,
the at least one selected preference is further for generating the haptic response based on a level of detected background noise at the second device.

23. The device of claim 15, wherein the haptic response comprises:
a temperature-based haptic response;
a vibration-based haptic response;
a pressure-based haptic response;
a texture-based haptic response; or
a tapping-based haptic response.

24. A system to enhance electronic communications with emotional context, comprising:
a first device configured to:
capture an expression of a user of the first device, the captured expression comprising a facial expression or physiological data;
generate data associated with the captured expression of the user, the generated data comprising:
an emotional indicator representative of an emotional state of the user of the first device, wherein the emotional indicator comprises an arousal level and a valence level, each associated with the captured expression of the user of the first device; and
a time indicator representative of a real-time emotional state of the user of the first device, the time indicator indicating a time period during which the emotional state of the user is manifested;
transmit the generated data;
a second device configured to:
receive the generated data associated with the captured expression;
analyze the received generated data to extract the time indicator and the emotional indicator;
generate a haptic response for the generated data based on the emotional state of the user corresponding to the extracted emotional indicator and based on at least one preference selected by a user of the second device, the at least one selected preference for generating the haptic response based on a location of the second device; and
synchronize the generation of the haptic response with a playback of the electronic communications using the extracted time indicator, the haptic response associated with the electronic communications.

25. The system of claim 24, wherein the generation of data associated with the captured expression comprises:
identifying the arousal level and the valence level associated with the captured expression; and
encoding data representative of the identified arousal level, the identified valence level, and the time indicator.

26. The system of claim 25, wherein,
the arousal level indicates a level of intensity associated with the captured expression of the user of the first device.

27. The system of claim 25, wherein,
the valence level indicates a level of pleasure associated with the captured expression of the user of the first device.

28. The system of claim 24, wherein the generation of data associated with the captured expression comprises:
identifying the arousal level and the valence level at each of a plurality of different time periods, wherein the arousal level and the valence level are representative of the emotional state of the user of the first device at each of the plurality of different time periods; and encoding data representative of the identified arousal level and the identified valence level at each of the plurality of different time periods.

29. A system to enhance electronic communications with emotional context, comprising:
    means for capturing an expression of a user of a first device, the captured expression comprising a facial expression or physiological data;
    means for generating data associated with the captured expression of the user, the generated data comprising:
    an emotional indicator representative of an emotional state of the user of the first device, wherein the emotional indicator comprises an arousal level and a valence level, each associated with the captured expression of the user of the first device; and
    a time indicator representative of a real-time emotional state of the user of the first device, the time indicator indicating a time period during which the emotional state of the user is manifested;
    means for transmitting the generated data;
    means for receiving, at a second device, the generated data associated with the captured expression;
    means for analyzing, at the second device, the received generated data to extract the time indicator and the emotional indicator;
    means for generating, at the second device, a haptic response for the generated data based on the emotional state of the user corresponding to the extracted emotional indicator and based on at least one preference selected by a user of the second device, the at least one selected preference for generating the haptic response based on a location of the second device; and
    means for synchronizing, at the second device, the generation of the haptic response with a playback of the electronic communications using the extracted time indicator, the haptic response associated with the electronic communications.

30. The system of claim 29, wherein the means for generating data associated with the captured expression comprises:
    means for identifying the arousal level and the valence level associated with the captured expression; and
    means for encoding data representative of the identified arousal level, the identified valence level, and the time indicator.

31. A computer program product comprising a non-transitory computer-readable medium, the computer-readable medium comprising:
    code to receive electronic communications from a first device, the electronic communications comprising data associated with an expression of a user captured at the first device, the captured expression comprising a facial expression or physiological data, the received electronic communications further comprising:
    an emotional indicator representative of an emotional state of the user of the first device, wherein the emotional indicator comprises an arousal level and a valence level, each associated with the captured expression of the user of the first device; and
    a time indicator representative of a real-time emotional state of the user of the first device, the time indicator indicating a time period during which the emotional state of the user is manifested;
    code to analyze the received data associated with the expression of the user to extract the emotional indicator and the time indicator;
    code to generate a haptic response for the received electronic communications based on the emotional state of the user corresponding to the extracted emotional indicator and based on at least one preference selected by a user of a second device that receives the electronic communications from the first device, the at least one selected preference for generating the haptic response based on a location of the second device; and
    code to synchronize the generation of the haptic response with a playback of the received electronic communications using the extracted time indicator, the haptic response associated with the received electronic communications.

* * * * *